United States Patent [19]

Blaisdell

[11] 4,252,074
[45] Feb. 24, 1981

[54] DISTRIBUTED LIFT SYSTEM FOR A CABLE

[75] Inventor: Kenneth L. Blaisdell, Groton, Conn.

[73] Assignee: The United States of America as represented by the Secretary of the Navy, Washington, D.C.

[21] Appl. No.: 298,095

[22] Filed: Oct. 5, 1972

[51] Int. Cl.³ .............................................. B63B 21/66
[52] U.S. Cl. ................................... 114/245; 114/243
[58] Field of Search ..................... 114/25, 209, 235 A, 114/235 B, 235 F, 235 R, 16 A, 16 R, 236; 174/101.5

[56] References Cited

U.S. PATENT DOCUMENTS

| 3,137,264 | 6/1964 | Brainard et al. | 114/244 |
| 3,224,406 | 12/1965 | Clark | 114/243 |
| 3,372,666 | 3/1968 | Baker | 114/245 |
| 3,547,068 | 12/1970 | Kramer | 114/243 |
| 3,625,172 | 12/1971 | Gilster | 114/245 |

Primary Examiner—David H. Brown
Attorney, Agent, or Firm—Richard S. Sciascia; Arthur A. McGill; Prithyl C. Lall

[57] ABSTRACT

A system using two or more lifting or depressing bodies positioned at intervals along a cable used for towing a device displaced above, below, or to one side of the tow point and for providing radio frequency services for a submerged submarine. Each of the lifting bodies is symmetrical about the cable and provides hydrodynamic lift, depression, or side force, depending on whether the system is designed to lift, depress, or offset the towed device.

8 Claims, 4 Drawing Figures

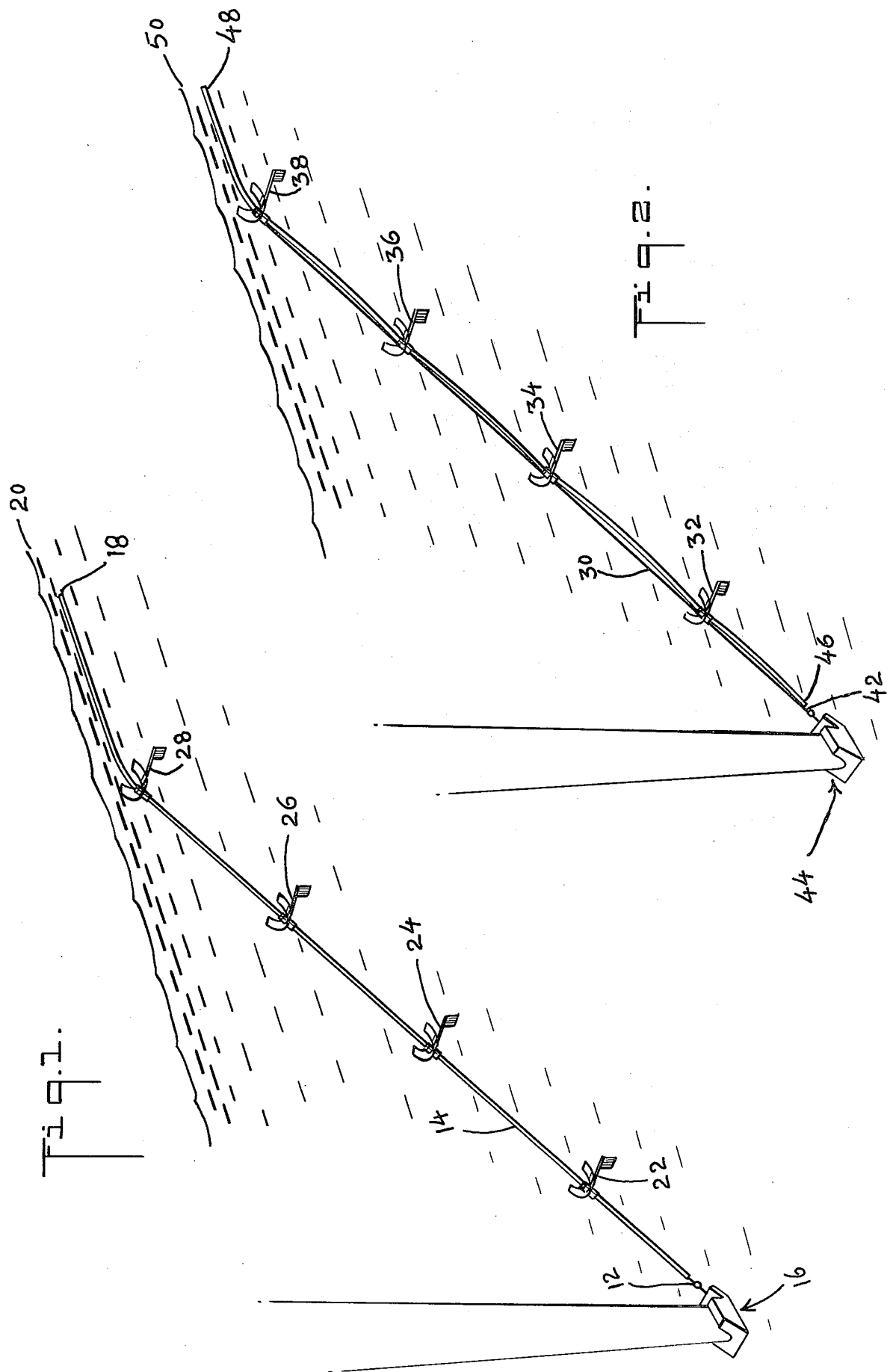

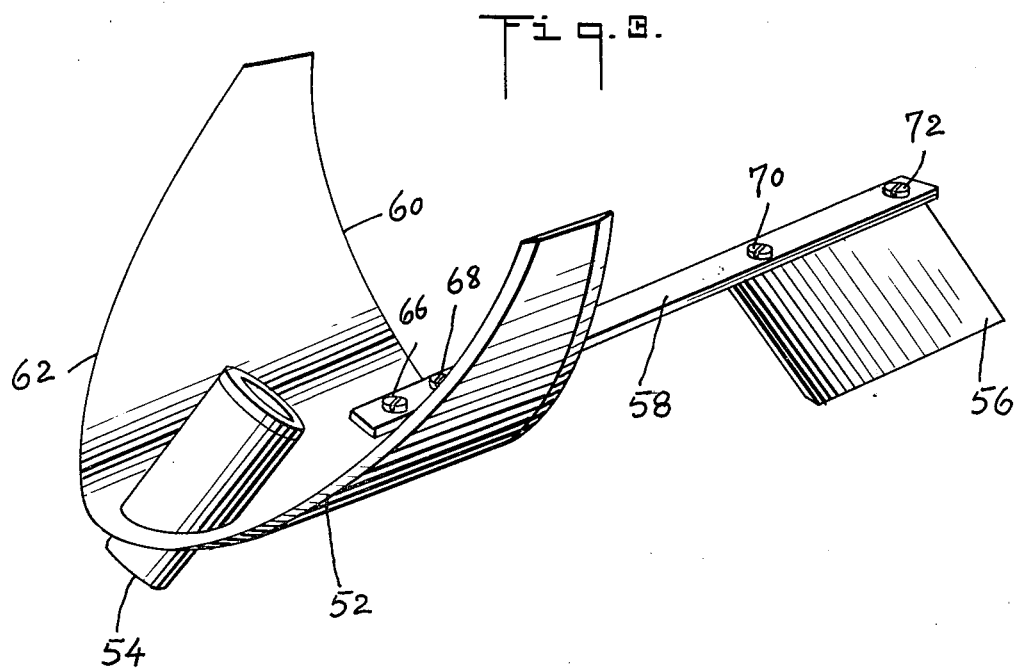
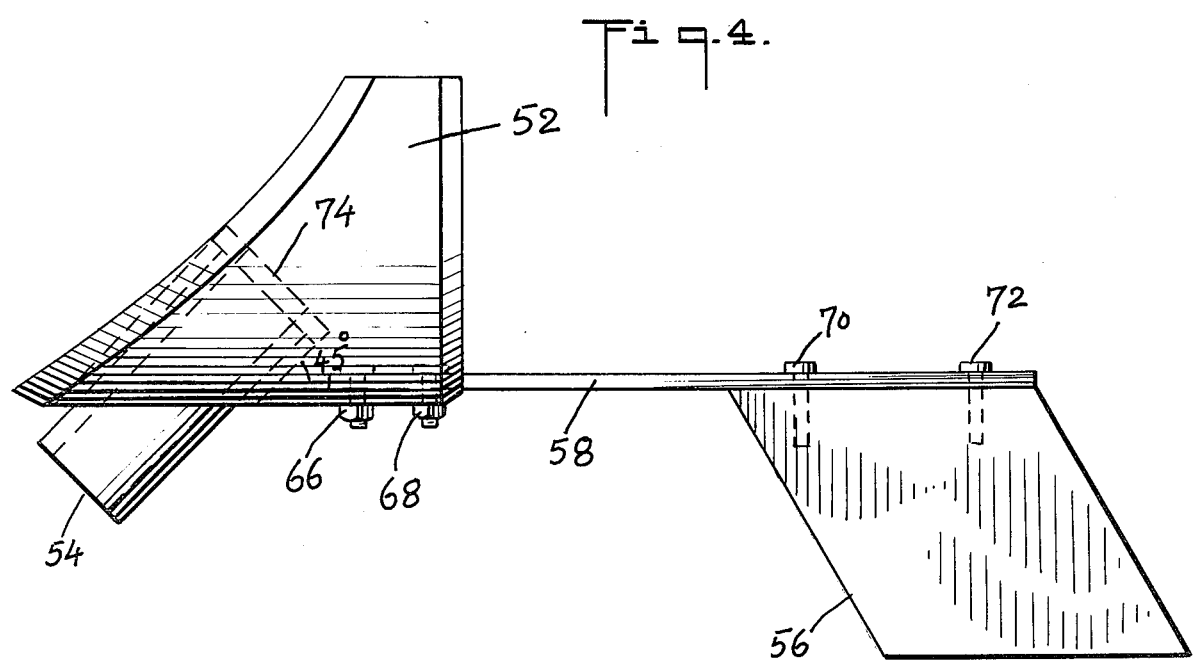

DISTRIBUTED LIFT SYSTEM FOR A CABLE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to underwater communication and more specifically to a distributed lift system for a signal cable used in radio communication between a submerged submarine and a surface vessel.

A major problem in submarine operation is radio communication while submerged. The severe attenuation of electromagnetic waves in seawater requires that an antenna be placed at or very near the surface of water. The systems currently used for this purpose are either a floating wire antenna or an antenna cable with a single hydrodynamic lifter attached near the free end of the cable. The floating wire system places very severe restrictions on operating depth and speed. The single lift system is better than the floating wire system, but it is also considered inadequate, partly because its size makes it diffficult to handle and stow and partly because its single catenary requires excessive lengths of cable as the submarine goes deeper.

It is thus desirable to improve the speed-depth performance of buoyant cable systems used on submarines to provide radio frequency services while submerged below periscope depth or for some other similar purposes.

SUMMARY OF THE INVENTION

The objects and advantages of the present invention are accomplished by using a distributed lift or multiple lifter system as an auxiliary system used with a buoyant cable towed by a submarine. The multiple lifter system comprises two or more lifting bodies spaced at intervals along a cable having one end attached to the submerged submarine and the other end floating on the surface or close enough to the surface of water to permit reception of radio frequency signals. Each of the lifting bodies is designed so as to be symmetrical about the cable when in use. The lifters can be either permanently attached to the signal cable or added as necessary to provide the required speed-depth capability. The distributed lift can also be embodied in an auxiliary subsystem in which the lifters are attached to a separate cable and the signal cable is thereby relieved of tensile stress. The lifters are preferably buoyant, enhancing their ability to rise toward the surface. Ideally, the lift should be distributed continuously over the length of the cable, but a multiple lifter arrangement is more practical, and therefore the following discussion is based on the latter.

It is an object of this invention to make a multi-floating bodies lift system for a cable to provide additional vertical displacement between the two ends of the cable.

Another object of this invention is to enhance the ability of the cable to rise to the surface.

An additional object of this invention is to circumvent attenuation of electromagnetic waves in seawater while providing radio frequency services in submarine operations.

Still another object of this invention is to distribute the lifting or hydrodynamic bodies along the cable to increase the directional stability of the cable.

An additional object of this invention is to construct the hydrodynamic bodies in a shape that can be easily stored while not in actual use.

Still another object of this invention is to reduce the length of cable required for a given displacement between a towed device and the towing vehicle's direction of motion.

An additional object of this invention is to reduce the tension required to tow a device displaced from a towing vehicle.

Other objects, advantages and novel features of the invention will become apparent from the following detailed description of the invention when considered in conjunction with the accompanying drawings wherein:

BRIEF DESCRIPTION OF THE DRAWINGS

FIG. 1 shows schematically a distributed lift or multiple lifter system for a single cable;

FIG. 2 shows schematically a distributed lift or multiple lifter system for two cables; one of which is a signal cable and the other is a mechanical cable for supporting the lifting bodies;

FIG. 3 is a perspective view of one of the lifting bodies used along the cable; and FIG. 4 represents another view of the lifting body of FIG. 3.

DESCRIPTION OF A PREFERRED EMBODIMENT

A preferred embodiment of a distributed lift or multiple lifter system having a single cable is shown in FIG. 1 wherein end 12 of cable 14 is attached to a tow point 16 of a submerged submarine and the open end 18 of cable 14 is floating near the surface 20 of water. Lifting bodies 22, 24, 26 and 28 are spaced between ends 12 and 18 of cable 14. FIG. 2 diagrammatically represents a distributed lift or multiple lifter system for two cables wherein cable 30 is a mechanical cable for carrying lifting bodies 32, 34, 36 and 38 and cable 40 is the signal cable. End 42 of mechanical cable 30 is attached to a submerged submarine 44 and to end 46 of signal cable 40. Open end 48 of signal cable 40 is floating near the water surface 50.

FIG. 3 shows a perspective view of one of the lifting bodies such as 22. Lifting body 22 comprises a lifting piece 52, a tube 54 secured in the lifting piece 52, a vertical tail piece 56, and a tail mounting arm 58. Lifting piece 52 is preferably made out of a plastic material such as lucite sheet, preferably of $\frac{1}{8}$ inch thickness. A piece of the lucite sheet is cut to a generally triangular shape. Trailing edge 60 and the leading edge 62 of the lucite sheet are filed sharp. The lucite piece is then softened by heating and formed around a half cylindrical wooden form. The shape of the lifting piece is generally that of an ellipsoid as shown in FIGS. 3 and 4. A hole, preferably of 1.25 in diameter, is cut through the lucite piece at an angle of 45 degrees with the tail mounting arm 58, the hole being approximately one and one third inches from the trailing edge 60 of the sheet as shown in FIGS. 3 and 4. A piece of the lucite tube having an outside diameter equal to the diameter of the hole is then inserted in the hole and is fixed with a suitable adhesive such as Epon resin and Epon U curing agent. The tail arm 58 is preferably cut from $\frac{1}{8}$ inch aluminum sheet and the vertical tail piece 56 is preferably cut from 0.1875 inch brass sheet. The tail arm 58 is attached to the lifting piece 52 by bolts 66 and 68 and is also secured to vertical tail piece 56 by screws 70 and 72. An inner bearing piece 74 is preferably machined from 1.25 inch diameter Lexan rod and a hole is drilled axially through this piece to allow for the insertion of the signal cable. Two holes are drilled in the inner bearing piece if the lift system is for two cables. Inner bearing piece 74 is preferably lubricated with silicone grease and inserted into the lifting surface 52 to form a simple bearing as shown in FIG. 4. The cables are inserted through the holes in the inner bearing piece. The lifting bodies such as 22 are fixed in position along the cable by attaching adhesive tape on the cable on both sides of the lifting body. All lifting bodies thus remain in their preset positions on the cable and are symmetrical to the cable and they can rotate around the cable. The lifting bodies can be easily stacked inside the submarine when they are not in use. The materials of various components of each of the lifting bodies are such that each lifting body is denser than the fluid in which it is designed to operate.

Thus, in a one cable or two cable distributed lift or multiple lifter system, the antenna end of a signal cable is kept on or close to the water surface by positioning the lifting bodies along the length of the cable. The size and number of lifting bodies used depends upon many factors: size and length of the signal cable, speed-depth capability requirements, and storage and handling limitations.

Obviously many modifications and variations of the present invention are possible in the light of the above teachings. As an example, the lifting piece 52 may be of any other suitable shape than being ellipsoidal. The tail piece 58 may be a different form of counterweight made of any other suitable material than brass. The lifting bodies may be attached to the signal or tow cable by means of tethers. It is therefore to be understood that within the scope of the appended claims the invention may be practiced otherwise than as specifically described.

I claim:

1. A multiple lifter system for a signal carrying means including a plurality of lifting bodies wherein each of said bodies comprises:
    a lifting piece having a leading edge and a trailing edge, said lifting piece having a hole proximate the leading edge thereof;
    a tubular piece secured in the hole of said lifting surface;
    a generally vertical tail piece;
    a tail arm secured to said lifting piece on one end and secured to said tail piece at the other end;
    an inner bearing piece demountably engaged in said tubular piece, said inner bearing piece having a hole for passing said signal carrying means therethrough; and
    means for retaining said plurality of lifting pieces in preset positions along said signal carrying means.

2. The multiple lifter system of claim 1 wherein said tail piece of each of said lift bodies is a brass plate.

3. The multiple lifter system of claim 1 wherein said tubular piece makes an angle of approximately forty-five degrees with the longitudinal direction of said tail arm.

4. The multiple lifter system of claim 1 wherein said means for retaining said plurality of lifting bodies in preset positions along said signal carrying means are pieces of adhesive tape applied proximate the ends of each of said plurality of lifting bodies.

5. The multiple lifter system of claim 1 wherein each of said lifting bodies is denser than the fluid in which said multiple lifter system is operated.

6. The multiple lifter system for a signal carrying means of claim 1 wherein said plurality of lifting bodies are attached to said signal carrying means by means of tethers.

7. The multiple lifter system of claim 1 wherein said lifting piece of each of said lifting bodies is of generally ellipsoidal shape.

8. The multiple lifter system of claim 7 wherein said lifting piece of each of said lifting bodies is a lucite piece.

* * * * *